Inventor
William Stanley Lee
By Cushman, Darby & Cushman
Attorneys

Inventor
William Stanley Lee
By Cushman, Darby & Cushman
Attorneys

United States Patent Office 3,578,428
Patented May 11, 1971

3,578,428
METHODS OF PRODUCING CERAMIC MATERIAL IN ROD OR TUBE FORM
William Stanley Lee, South Shields, England, assignor to James A. Jobling & Company Limited, Sunderland, England
Filed Nov. 4, 1968, Ser. No. 773,108
Int. Cl. C03c *17/00;* C03b *5/22*
U.S. Cl. 65—60          3 Claims

ABSTRACT OF THE DISCLOSURE

A method of producing ceramic material in rod or tube form comprising the steps of feeding lengths of ceramic material of specific desired composition to a melting chamber, melting the lengths of ceramic material in the chamber and continuously drawing ceramic material of rod or tube form from the chamber.

---

This invention relates to methods of producing ceramic material in rod or tube form and of forming such material into ceramic bodies for ceramic resistors, that is resistors having a ceramic body such as glass carrying an electrically conductive coating of desired electrical resistance.

According to the present invention there is provided a method of producing ceramic material in rod or tube form comprising the steps of feeding lengths of ceramic material of specific desired composition to a melting chamber constructed such that the material melted therein can be continuously drawn therefrom in rod or tube form, melting the lengths of ceramic material in the chamber and continuously drawing ceramic material of rod or tube form from the chamber.

For a better understanding of the invention and to show how the same may be carried into effect, reference will now be made, by way of example, to the accompanying drawings in which the three figures are diagrammatic sectional side views of various forms of melting chamber that can be utilised in methods of producing ceramic material in rod or tube form.

In each of these methods, glass cane or rod is continuously drawn from a glass melting furnace producing glass of very high quality i.e. of a specific desired composition, no strict control of the circularity, diameter or straightness of the cane or rod drawn being necessary, The can or rod is cut into convenient lengths and fed to the top of that one of the melting chambers of the figures that is to be utilised. The cane or rod can be stored prior to feeding to the melting chamber if so desired. Each of the melting chambers shown in the figures is constructed of a refractory material or refractory métal alloy, for example, platinum or platinum rhodium and is apertured at the top 1 to receive the lengths of glass cane or rod. The internal structure of the chamber is such as to provide both structural strength and rigidity at high temperatures, and barriers (not shown) are provided for resisting the passage of cooler molten glass to the base of the chamber. Low voltage, high amperage electrodes (also not shown) are associated with the melting chamber such that it operates as a resistance-heated melting chamber.

Figure 1:
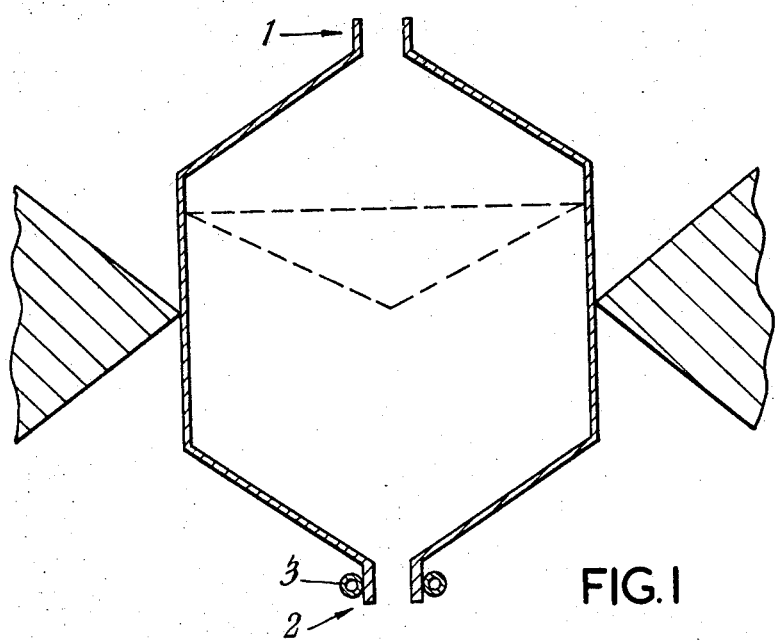

The base 2 of the melting chamber terminates in an orifice constituting the outlet of the chamber and dimensioned, in one particular example of the chamber of FIG. 1, such that a rod of the order of ¼" in diameter can be drawn from the chamber. The orifice is replaceable and by using differently dimensioned orifices rod of from ¹⁄₁₀" to ½" in diameter can be drawn from the chamber. The orifice has an associated collar (not shown) in which ducts 3 are provided through which cooling fluid can be circulated.

The cane or rod fed to the melting chamber is supplied in quantities, and the temperature of the chamber controlled, such that a desired quantity of glass flows through the orifice. The temperature of the glass flowing from the orifice, which is dependent upon the temperature of the melting chamber and on the amount of glass flowing through the orifice, is maintained at a desired value by the cooling fluid circulated through said ducts, this temperature being maintained at a level such that, and the design of the orifice being such that, the glass flowing through the orifice cools very rapidly to a degree where the viscosity of the glass is sufficiently high to maintain an accurate and uniform diameter and circularity.

The glass flowing from the orifice of the melting chamber is pulled downwards by a pulling mechanism the linear speed of which is adjusted to maintain the desired diameter and circularity of the rod. Thus glass in rod form is produced. With a particular melting chamber of the form shown in FIG. 1, capable of melting glass cane stock material at a mass flow rate of 7 lbs. per hour and having an outlet orifice 0.5 ins. in diameter, and with the melting chamber temperature controlled to give a glass material having a viscosity within the range of $6 \times 10^3$ poises to $5 \times 10^5$ poises, rod ranging in diameter from $1 \times 10^{-2}$ ins. to $32 \times 10^{-2}$ ins. can be provided.

If the rod produced is to be used to produce glass resistor bodies, the rod is pulled downwards through an annular heat source and then through a chamber in which it is subjected to an atmosphere of vaporous coating material, for example tin oxide. The annular heat source is provided to heat the glass to a temperature such that coating will take place.

The pulling mechanism is such that the coated rod emerging from the vapour chamber passes through the pulling mechanism and the coated rod emerging from the pulling mechanism is cut into convenient lengths. These lengths of coated rod are passed through a machine which cuts away the coating along a predetermined spiral path until an electrically conductive path of desired electrical resistance is formed along each length of rod. The ends of each length of rod are then trimmed so that the length of rod remaining has a desired electrical resistance and forms a glass resistor body. To produce a glass resistor the length of rod forming the body is provided with electrical contacts at each end and the whole rod, except the contacts, is encapsulated in an insulating material.

In a modification of the method described above the glass drawn from the melting chamber is passed through a series of annular heating sources and vapour chambers.

Figure 2:
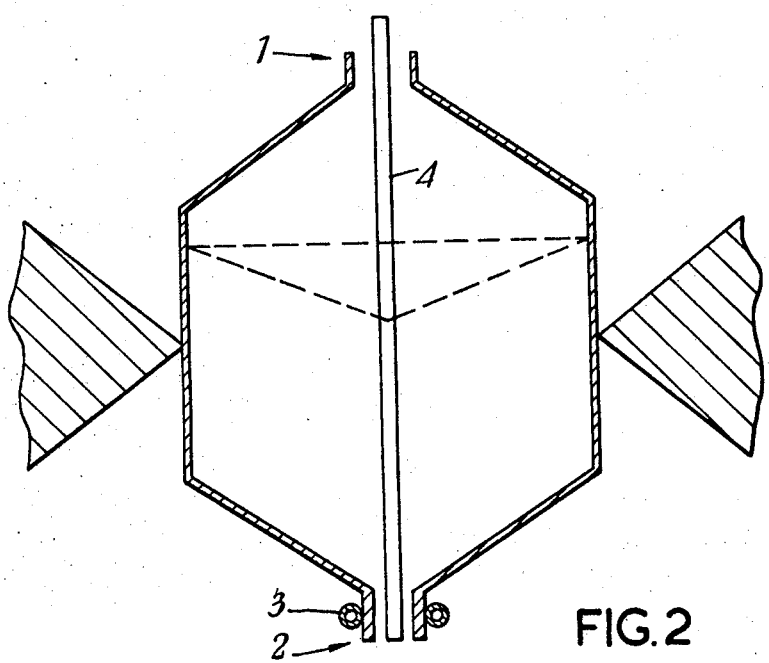

The melting chamber of FIG. 1 is suitable for use in a method such as that described above. If it is desired to produce glass in tube rather than rod form the chamber modified as shown in FIG. 2 is utilised. In this modification, a tubular refractory, or refractory metal alloy, member 4 is situated within the melting chamber so that the lower end thereof is concentric with the orifice in the base 2 of the chamber and approximately horizontally level with the lowermost level of the orifice. This lower end of the tubular member has an outside diameter at this point less than the internal diameter of the orifice but may extend downwards through the orifice and increase in diameter below this point. The spaced relationship of the tubular member to the internal surface of the orifice is designed to allow a uniform annular flow of molten glass between them. The upper end of the tubular member is constructed so that it passes out of the main body of the melting chamber at the top 1 of the chamber and is able to be connected to a supply of fluid, the pressure and or temperature of which can be varied. The tubular member may, or may not as desired, be electrically integral with the melting chamber in order that it may, or may not, form part of the resistance heated chamber.

In operation utilising the chamber as shown in FIG. 2, precisely dimensioned tubing is continuously produced by controlling the flow of glass from the orifice and the flow of gas through the tubular member to produce a differential pressure between the interior of the soft glass tubing and the exterior, which may be different from or equal to atmospheric pressure, and by controlling the linear speed at which the formed glass tubing is pulled down.

Figure 3:
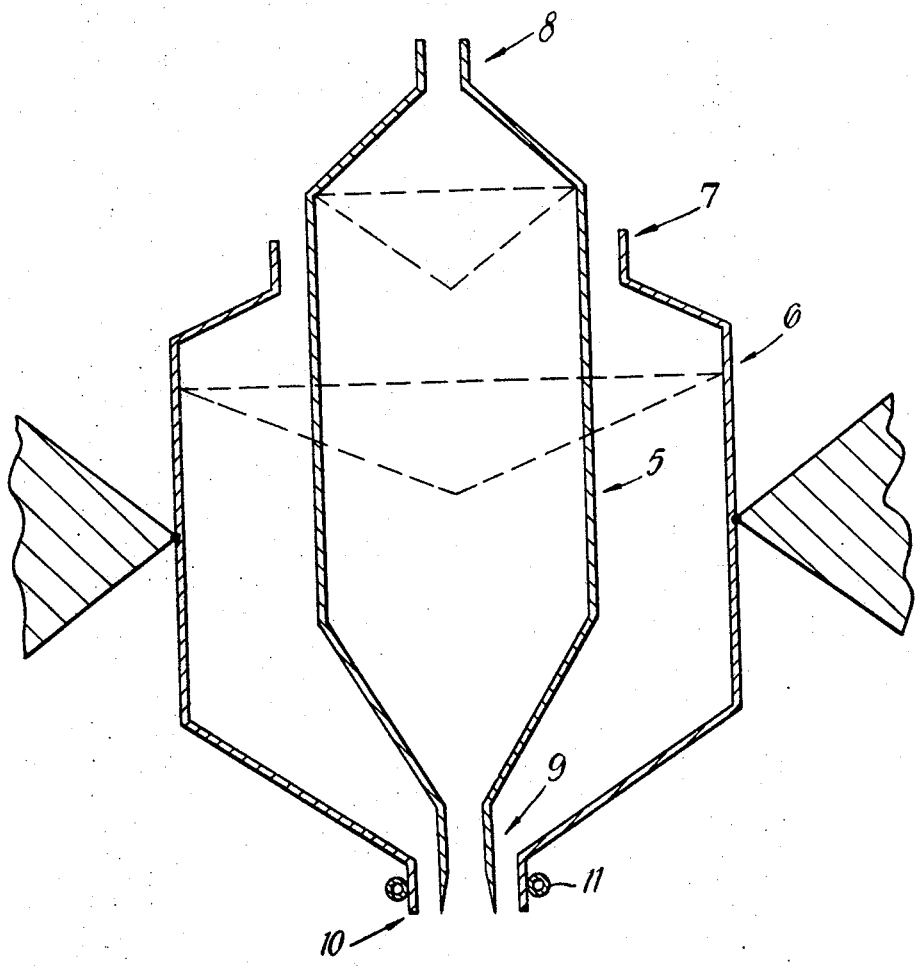

If it is desired to produce glass in multicore rod form the chamber of FIG. 3 is utilised. This chamber is a composite chamber consisting of an inner chamber 5 and an outer chamber 6. The inner chamber 5 projects from the top 7 of the outer chamber, both the top 7 of the outer chamber and the top 8 of the inner chamber being apertured to receive lengths of glass cane or rod as already described for the chambers of FIGS. 1 and 2. The bases 9 and 10 respectively of the inner and outer chambers 5 and 6 terminate each in an orifice, the two orifices being substantially co-planar and together constituting the outlet of the composite chamber. Ducts 11 for cooling fluid are associated with the orifice at the base of the outer chamber 6 and the construction of the inner and outer chambers is similar to that of the chambers already described with reference to FIGS. 1 and 2. The composite chamber of FIG. 3 is utilised in a manner similar to the way in which the chamber of FIG. 1 is described above as being utilised.

What is claimed is:

1. A method of producing ceramic material in rod or tube form having accurate and uniform diameter and circularity, said method comprising: drawing ceramic rod or tube without strict control of the diameter, circularity or straightness thereof from a melting furnace of a type which produces ceramic material of a predetermined uniform composition thereby producing a rod or tube of desired high quality composition but lacking desirable uniformity of size and shape; cutting said rod or tube into lengths; and redrawing the ceramic material by continuously feeding said lengths into the top of a resistance-heated melting chamber, melting said lengths in said melting chamber to form a mass of molten ceramic, continuously pulling rod or tube downwardly from an orifice in the bottom of the melting chamber, cooling the walls of the orifice, and controlling the quantity of lengths entering the chamber, the temperature of the molten ceramic in the chamber, the temperature of the molten ceramic flowing through the orifice and the linear pulling speed to produce a rod or tube having accurate and uniform diameter and circularity.

2. A method of producing ceramic bodies for ceramic resistors, utilising the method of claim 1, wherein said material flowing from said outlet is pulled through an annular heat source and then through a chamber in which the material is subjected to an atmosphere of vaporous, electrically conductive, coating material, such as tin oxide, the material being heated by said annular heat source to a temperature such that it becomes coated by said coating material; the coated material thereafter being cut into desired lengths that are to form ceramic bodies for ceramic resistors and the method further comprising cutting away the coating of coating material from these lengths along a predetermined spiral path so as to leave an electrically conductive path of desired electrical resistance along each of the lengths.

3. A method as claimed in claim 2, wherein said material flowing from said outlet is pulled through a series of annular heating sources and vapour chambers.

References Cited

UNITED STATES PATENTS

| | | | |
|---|---|---|---|
| 1,653,848 | 12/1927 | Grotta | 65—86 |
| 1,926,905 | 9/1933 | Le Coultre | 65—86X |
| 2,495,956 | 1/1950 | Cook | 65—2 |
| 3,410,672 | 11/1968 | Lajarte | 65—3 |

FOREIGN PATENTS

| | | | |
|---|---|---|---|
| 1,158,476 | 6/1958 | France | 65—121 |

S. LEON BASHORE, Primary Examiner

R. L. LINDSAY, JR., Assistant Examiner

U.S. Cl. X.R.

65—86, 126, 134, 136